United States Patent
Wei

(10) Patent No.: US 10,857,462 B2
(45) Date of Patent: Dec. 8, 2020

(54) VIRTUAL CHARACTER CONTROLLING METHOD AND APPARATUS, ELECTRONIC DEVICE, AND STORAGE MEDIUM

(71) Applicant: NETEASE (HANGZHOU) NETWORK CO., LTD., Zhejiang (CN)

(72) Inventor: Yiming Wei, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/132,491

(22) Filed: Sep. 17, 2018

(65) Prior Publication Data
US 2019/0126148 A1 May 2, 2019

(51) Int. Cl.
A63F 13/5255 (2014.01)
A63F 13/837 (2014.01)
A63F 13/2145 (2014.01)

(52) U.S. Cl.
CPC ...... *A63F 13/5255* (2014.09); *A63F 13/2145* (2014.09); *A63F 13/837* (2014.09)

(58) Field of Classification Search
CPC . A63F 13/5255; A63F 13/2145; A63F 13/837
See application file for complete search history.

(56) References Cited

U.S. PATENT DOCUMENTS

| | | | |
|---|---|---|---|
| 9,704,350 B1 | 7/2017 | Rigopulos et al. | |
| 2006/0084509 A1* | 4/2006 | Novak | A63F 13/12 463/49 |
| 2013/0288790 A1* | 10/2013 | Wang | A63F 13/06 463/31 |
| 2015/0258442 A1* | 9/2015 | Yudo | A63F 13/537 463/31 |
| 2016/0250554 A1 | 9/2016 | Haigh-Hutchinson | |
| 2017/0282076 A1* | 10/2017 | Tsui | A63F 13/56 |
| 2017/0319961 A1* | 11/2017 | Dunn | A63F 13/25 |

FOREIGN PATENT DOCUMENTS

| | | |
|---|---|---|
| CN | 105688409 A | 6/2016 |
| CN | 107168611 A | 9/2017 |
| WO | 2016167664 A | 10/2016 |

OTHER PUBLICATIONS

CN Search results report dated Jul. 16, 2020.

* cited by examiner

*Primary Examiner* — Werner G Garner
(74) *Attorney, Agent, or Firm* — Gang Yu

(57) ABSTRACT

A virtual character controlling method and apparatus, an electronic device, and a storage medium are provided. The method includes: when detecting a first sliding operation on a shooting control, a virtual character is controlled to move according to the first sliding operation; when detecting a second sliding operation on an aiming area, an aiming direction of the virtual character is adjusted according to the second sliding operation; and when detecting the first sliding operation on the shooting control is ended, the virtual character is controlled to stop moving, and a shooting operation is performed toward a current aiming direction of the virtual control object.

19 Claims, 2 Drawing Sheets

VIRTUAL CHARACTER CONTROLLING METHOD AND APPARATUS, ELECTRONIC DEVICE, AND STORAGE MEDIUM

CROSS-REFERENCE TO RELATED APPLICATIONS

The present disclosure claims priority of Chinese Patent Application No. 201710999944.8, filed to China Patent Office on Oct. 24, 2017. Contents of the present disclosure are hereby incorporated by reference in entirety of the Chinese Patent Application.

TECHNICAL FIELD

The present disclosure relates to the technical field of games, and more particularly to a virtual character controlling method and apparatus, an electronic device, and a storage medium.

BACKGROUND

With the development of mobile smart terminals and the game industry, a large number of mobile games with different themes have emerged to meet needs of users. In various shooting game applications, it is usually necessary to aim at a virtual shooting object and execute a shooting operation.

SUMMARY

At least some embodiments of the present disclosure provide a virtual character controlling method, a virtual character controlling method apparatus, an electronic device, and a computer-readable storage medium.

In one embodiment of the present disclosure, a virtual character controlling method is provided. The method is provided by a mobile terminal having at least one processor for executing a software application and a touch screen rendered with a graphical user interface. The graphical user interface includes a shooting control and an aiming area, and the shooting control and the aiming area are arranged on different sides of the graphical user interface. The method includes that:

when detecting a first sliding operation on the shooting control, controlling a virtual character to move according to the first sliding operation; when detecting a second sliding operation on the aiming area, adjusting an aiming direction of the virtual character according to the second sliding operation; and when detecting the first sliding operation on the shooting control is ended, controlling the virtual character to stop moving, and performing a shooting operation toward a current aiming direction of the virtual control object.

In another embodiment of the present disclosure, a virtual character controlling method apparatus is provided. The apparatus is provided by a mobile terminal having at least one processor for executing a software application and a touch screen rendered with a graphical user interface. The graphical user interface includes a shooting control and an aiming area, and the shooting control and the aiming area are arranged on different sides of the graphical user interface. The apparatus includes:

a first interactive element, configured to control, when detecting a first sliding operation on a shooting control, a virtual character to move according to the first sliding operation; a second interactive element, configured to adjust, when detecting a second sliding operation on an aiming area, an aiming direction of the virtual character according to the second sliding operation; and a shooting control element, configured to control, when detecting the first sliding operation on the shooting control is ended, the virtual character to stop moving, and perform a shooting operation toward a current aiming direction of the virtual control object.

In another embodiment of the present disclosure, a computer-readable storage medium is provided, on which at least one computer program may be stored, and the at least one computer program may be executed by at least one processor to implement the above virtual character controlling method.

In another embodiment of the present disclosure, an electronic device is provided. The electronic device includes: at least one processor; and at least one memory, configured to store at least one executable instruction of the at least one processor, and the at least one processor is configured to execute the above virtual character controlling method by executing the at least one executable instruction.

A shooting control and an aiming area are provided in a graphical user interface, and when detecting a first sliding operation on the shooting control, a virtual character is controlled to move according to the first sliding operation; when detecting a second sliding operation on the aiming area, an aiming direction of the virtual character is adjusted according to the second sliding operation; and when detecting the first sliding operation on the shooting control is ended, the virtual character is controlled to stop moving, and a shooting operation is performed toward the current aiming direction of the virtual control object.

By means of the method provided in at least one of the embodiments of the present disclosure, on one hand, a user may simultaneously control a virtual character to perform moving, aiming and shooting operations by cooperation of both hands, so that a time difference caused by aiming and shooting operations in the related art could be avoided, any switching operations are not needed from target discovery to shooting completion, the operation is not interrupted, and the aiming operation and the shooting operation are more efficient, convenient and smooth. On the other hand, since a player may always keep an aiming correction action without needing to raise the fingers to perform the shooting operation, the problem of aim shake and offset is avoided, and the shooting efficiency is improved.

In addition, the method provided in at least one of the embodiments of the present disclosure brings a richer game experience to the player, and the game strategy feeling will be improved, thus solving the technical problem of difficulty in smooth completion of three actions namely moving, aiming and shooting of a shooting game in an interactive mode of a mobile terminal.

DETAILED DESCRIPTION

Figure 1:
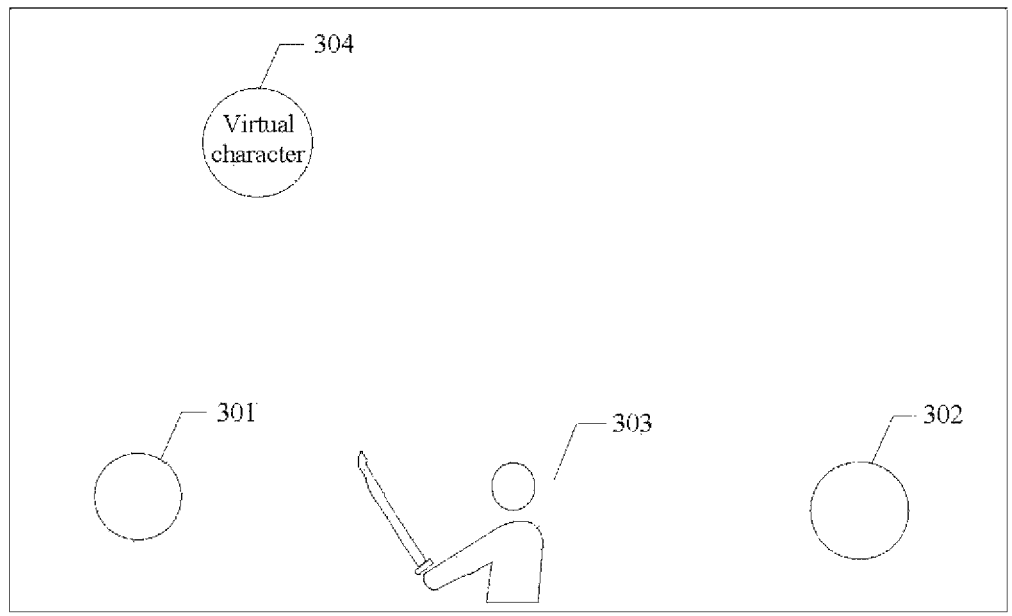
FIG. 1 illustrates a schematic diagram of a first graphical user interface of a mobile terminal in an exemplary embodiment of the present disclosure.

In order to make those skilled in the art better understand the solutions of the present disclosure, the technical solutions in the embodiments of the present disclosure will be described clearly and completely below with reference to the accompanying drawings in the embodiments of the present disclosure. Apparently, the described embodiments are a part of the embodiments of the present disclosure, not all of the embodiments. On the basis of the embodiments of the present disclosure, all other embodiments obtained on the premise of no creative work of those skilled in the art fall within the protection scope of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In most shooting mobile game applications provided in the related art, a moving operation is usually completed with a left hand, and an aiming operation and a shooting operation are completed in sequence with a right hand. Since one of the hands needs to complete at least two operations, three actions namely a moving action, an aiming action and a shooting action cannot be smoothly completed in the shooting mobile game applications. This interactive manner increases an action load of a player, reduces a shooting efficiency of the player, and further affects game experience.

In one embodiment of the present disclosure, a virtual character controlling method is provided. It should be noted that the steps shown in the flowchart of the drawings may be performed in a computer system such as a set of computer-executable instructions, and although a logical order is shown in the flowchart, in some cases, the illustrated or described steps may be performed in an order other than the above.

In the present exemplary embodiment, a virtual character controlling method is first disclosed. The method may be provided by a mobile terminal having at least one processor for executing a software application and a touch screen rendered with a graphical user interface. The software may be a shooting mobile game application, and the method may be provided to control a virtual character to execute at least one shooting operation through the graphical user interface.

As shown in FIG. 1, the graphical user interface may include a shooting control 301, an aiming area 302, a virtual character 303 and at least one virtual shooting object 304. The virtual character 303 may be configured to move according to the shooting control 301. The shooting control 301 and the aiming area 302 are arranged on different sides of the graphical user interface. For example, the aiming area 302 may be located at any position on a right side of the graphical user interface, and the corresponding shooting control 301 may be located at any position on a left side of the graphical user interface.

In addition, the graphical user interface may further at least partially include a game scene such as a virtual battle scene and a virtual natural environment, as well as a map control area, an information panel control area, and a blank area other than each control area. The virtual character 303 may be of multiple presentation forms. For example, when a game application is a first-person shooter game, the virtual character 303 may be presented as a virtual gun, a tool or the like, or may also be presented as a shooting gun, a mortar or the like. For another example, when the game application is a third-person shooter game, the virtual character 303 may be respectively presented as different postures when holding a pistol, a sniper rifle, a shooting gun or a mortar, so that a player can quickly distinguish a type of a virtual weapon held in the virtual character 303.

Figure 2:
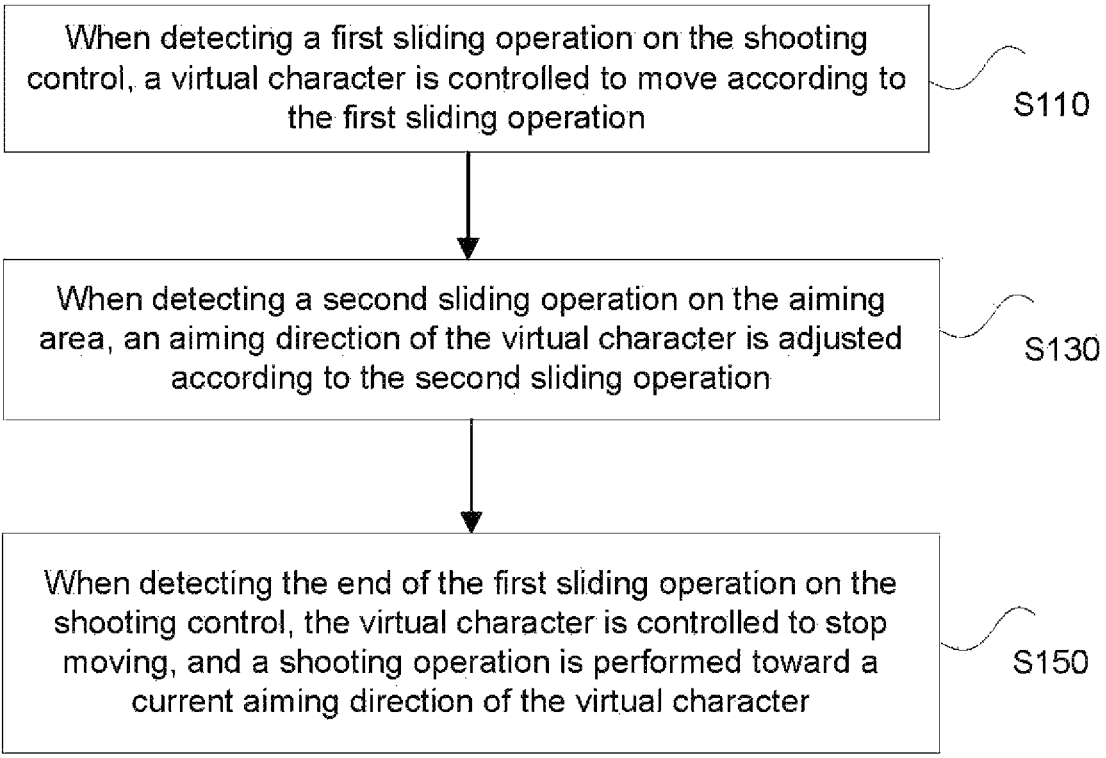
FIG. 2 illustrates a flowchart of a virtual character controlling method in an exemplary embodiment of the present disclosure.

The mobile terminal may be, for example, a mobile phone, a tablet computer, a notebook computer, a game machine, a Personal Digital Assistant (PDA) or other electronic devices with a touch display screen. According to an embodiment as shown FIG. 2, the virtual character controlling method may include the steps as follows.

At step S110, when detecting a first sliding operation on the shooting control, a virtual character is controlled to move according to the first sliding operation.

At step S130, when detecting a second sliding operation on the aiming area, an aiming direction of the virtual character is adjusted according to the second sliding operation.

At step S150, when detecting the end of the first sliding operation on the shooting control, the virtual character is controlled to stop moving, and a shooting operation is performed toward a current aiming direction of the virtual character.

By means of the method provided in one of the embodiments of the present disclosure, on one hand, a user can simultaneously control a virtual character to perform moving, aiming and shooting operations by the cooperation of both hands, so that a time difference caused by aiming and shooting operations in the conventional art can be avoided, any switching operations are not needed from target discovery to shooting completion, the operation is not interrupted, and the aiming operation and the shooting operation are more efficient, convenient and smooth. On the other hand, since a player may always keep an aiming correction action without needing to raise the fingers to perform the shooting operation, the problem of aim shaking and offsetting is avoided, and the shooting efficiency is improved.

Each step of the virtual character controlling method in the present exemplary embodiment will be further described below with reference to FIG. 3 and FIG. 4.

At step S110, when detecting a first sliding operation on the shooting control, a virtual character is controlled to move according to the first sliding operation.

Specifically, a shooting control 301 is provided in a graphical user interface, and when detecting a first sliding operation on the shooting control 301, a virtual character 303 is controlled to move in a game scene according to the first sliding operation.

The shooting control 301 may be a visible area in the graphical user interface, or may be an invisible area. Or, a control area of a virtual joystick or at least one direction control virtual key may be displayed in the shooting control 301, which is not limited in the present exemplary embodiment.

In an alternative embodiment of the present disclosure, the shooting control 301 is a virtual joystick control area which is located on the lower left of the graphical user interface. The virtual character 303 is controlled to perform at least one of movement and turning around in the game scene according to a first sliding operation received in the virtual joystick operation area.

It should be understood that in other embodiments, the shooting control 301 is a virtual cross key area or a virtual direction key (D-PAD) area. The virtual character 303 is controlled to perform at least one of movement and turning around in the game scene according to a first touch operation received in the virtual cross key area.

As an alternative embodiment, the shooting control 301 may be a visible area in the graphical user interface. For example, the shooting control 301 may have a geometric center frame, or have a certain area rendered with color or predetermined transparency, or be adopted other modes to be distinguished visually. The virtual character 303 is controlled to perform at least one of movement and turning around in the game scene according to the first sliding operation received in the shooting control 301. The visible shooting control 301 can quickly be positioned by a user, and reduce an operation difficulty of a game novice.

As another alternative embodiment, the shooting control 301 may be an invisible area in the graphical user interface. The invisible shooting control 301 would not block or affect a game screen, and save the screen space, so as to provide a better view for players.

In the present exemplary embodiment, when detecting the first sliding operation on the shooting control, first indication information is provided.

The first indication information is used for indicating a current display state of the virtual character 303, and would prompt the player to distinguish a type of a current operated control. The first indication information may be an indication icon located above the virtual character 303, or may be a posture of the virtual character 303, or other information capable of indicating the display state of the virtual character 303. For example, when detecting the first sliding operation on the shooting control 301, the virtual character 303 presents a posture of running with a virtual gun held in the hands.

At step S130, when detecting a second sliding operation on the aiming area, an aiming direction of the virtual character is adjusted according to the second sliding operation.

In the present exemplary embodiment, an aiming area 302 is provided on the graphical user interface. As mentioned above, the aiming area 302 and the shooting control 301 are arranged on different sides of the graphical user interface. For example, the aiming area 302 may be located at any position on the right side of the graphical user interface, and the corresponding shooting control 301 may be located at any position on the left side of the graphical user interface. In an optional embodiment of the present disclosure, the aiming area 302 is located at the lower right of the graphical user interface, and the corresponding shooting control 301 is located at the lower left of the graphical user interface. Thus, in the present embodiment, it is convenient to control the virtual character 303 to perform operations such as movement and turning around in the game scene with a left hand and to control the virtual character 303 to perform an aiming operation with a right hand.

The aiming area 302 may be a visible area in the graphical user interface, or may be an invisible area. Or, a control area of a virtual joystick or at least one direction control virtual key may be displayed in the aiming area 302, which is not limited in the present exemplary embodiment.

In the present exemplary embodiment, for indicating an aiming direction, when detecting a second sliding operation on the aiming area 302, a telescopic sight model 305 corresponding to the aiming area 302 is provided in a geometric center of the graphical user interface. Specifically, when detecting a second sliding operation on the aiming area 302, the telescopic sight model 305 corresponding to the aiming area 302 is provided in a geometric center of the graphical user interface, and the aiming direction of the virtual character 303 is controlled according to the second sliding operation. For example, as shown in FIG. 4, with respect to FIG. 3, a touch point of the second sliding operation on the aiming area 302 moves toward an 11-o'clock orientation. Therefore, the aiming direction of the virtual character 303 also correspondingly moves from an initial orientation to the 11-o'clock orientation. However, the telescopic sight model 305 corresponding to the aiming area 302 is fixed in the center of the graphical user interface without change, so as to aim at the virtual shooting object by means of an aim point fixed in the center of the screen.

Specifically, the step of adjusting an aiming direction of the virtual character according to the second sliding operation includes that: a current position of a touch point of the second sliding operation is acquired, and a vector distance between the current position and a geometric center of the aiming area is calculated; and an aiming direction of the virtual character is adjusted according to the vector distance between the current position of the touch point of the second sliding operation and the geometric center of the aiming area.

In the present exemplary embodiment, the vector distance between the current position of the touch point of the second sliding operation and the position of the aiming area 302 may be calculated according to the current position of the touch point of the second sliding operation and the geometric center of the aiming area 302. Specifically, a coordinate system may be first established to monitor the second sliding operation of a user on the aiming area 302 in real time, to acquire and record coordinates of the current position of the touch point of the second sliding operation in real time, so as to obtain an offset direction and offset distance of the current position of the touch point of the second sliding operation relative to the geometric center of the aiming area 302 according to a distance formula. When the position of the touch point of the second sliding operation moves repeatedly, the offset direction and the offset distance of the current position of the touch point of the second sliding operation relative to a circular position of the aiming area 302 may be calculated, or the offset direction and the offset distance of the current position of the touch point relative to a position of a touch point of a previous second sliding operation may also be calculated.

Figure 3:
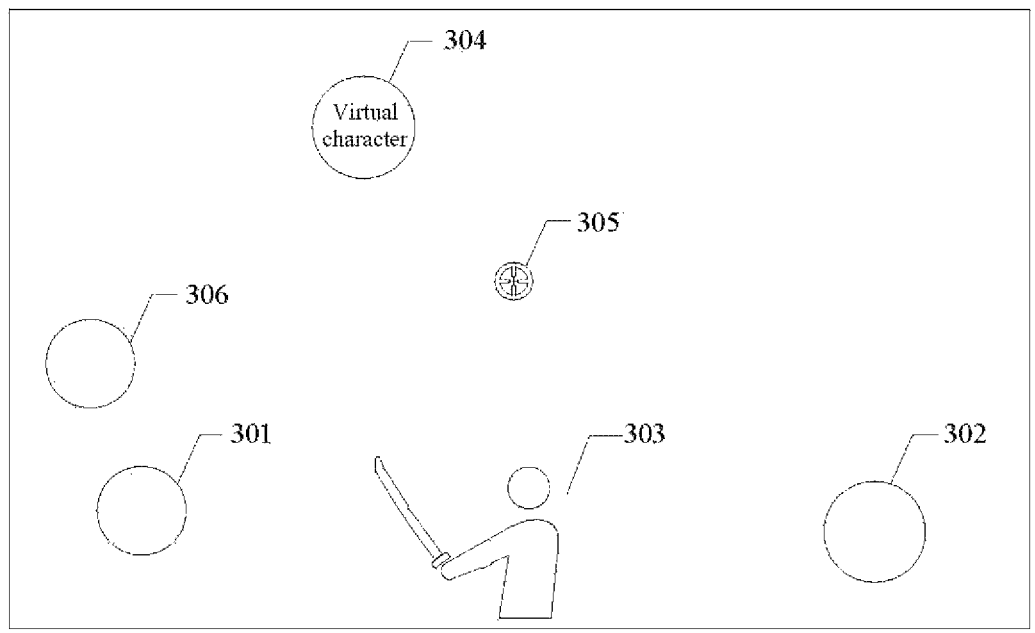
FIG. 3 illustrates a schematic diagram of a second graphical user interface of a mobile terminal in an exemplary embodiment of the present disclosure.
Figure 4:
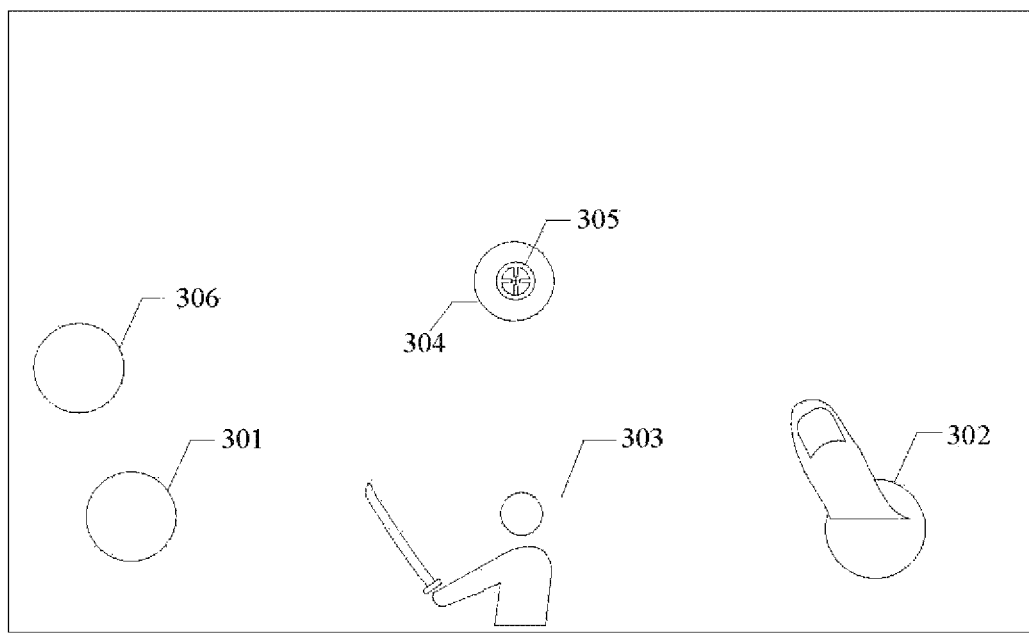
FIG. 4 illustrates a schematic diagram of a third graphical user interface of a mobile terminal in an exemplary embodiment of the present disclosure.

For example, as shown in FIG. 4, with respect to FIG. 3, a virtual shooting object 304 exists in the 11-o'clock orientation of the virtual character 303, so the touch point of the second sliding operation on the aiming area 302 moves toward the 11-o'clock orientation. Therefore, the aiming direction of the virtual character 303 also correspondingly moves from an initial orientation to the 11-o'clock orientation, and the virtual shooting object 304 in the 11-o'clock orientation is determined as a target shooting object. However, the telescopic sight model 305 is fixed in the center of the graphical user interface.

At step S150, when detecting the end of the first sliding operation on the shooting control, the virtual character is controlled to stop moving, and a shooting operation is performed toward a current aiming direction of the virtual control object.

At step 130, after the aiming direction of the virtual character is adjusted according to the second sliding operation, when detecting the end of the first sliding operation on the shooting control 301, the virtual character 303 is controlled to stop moving, and the shooting operation is performed toward the current aiming direction of the virtual character 303. When the virtual character 303 is controlled to move with a left hand, the aiming direction may be adjusted with a right hand. After aiming at the virtual shooting object 304, the left hand is loosened to perform the shooting operation, thereby avoiding the problems of time difference, aim point offsetting and the like caused by switching the aiming operation and the shooting operation in the related art, and making the operation more efficient. Moreover, when the shooting operation is performed, the aiming direction can be adjusted at any time, and the problem of aim point offset caused by recoil in the continuous shooting process is avoided.

The end of the sliding operation may refer to that a touch object (such as a touch pencil or a finger) leaves the touch display screen.

In the present exemplary embodiment, when detecting a touch operation on a preset area, the virtual character is controlled to stop shooting.

Specifically, the preset area may be an area covered by the shooting control 301, or may also be any area other than the shooting control 301. The touch operation may be an operation such as sliding, clicking, long pressing or heavy pressing.

For example, when detecting the end of the first sliding operation on the shooting control 301, the virtual character 303 is controlled to stop moving, and a shooting operation is performed toward a current aiming direction of the virtual character 303. And when detecting the first sliding operation on the shooting control 301 again, the virtual character 303 is controlled to stop shooting, and step 110 is performed, that is, the virtual character 303 is controlled to move according to the first sliding operation. For another example, when detecting the end of the first sliding operation on the shooting control 301, the virtual character 303 is controlled to stop moving, and a shooting operation is performed toward a current aiming direction of the virtual character 303. And when detecting a click operation on any area other than the shooting control 301 on the graphical user interface, the virtual character 303 is controlled to stop shooting.

Further, the graphical user interface further includes a moving control, and the method includes that: when detecting a third sliding operation on the moving control, the virtual character is controlled to move according to the third sliding operation. And when detecting the end of the third sliding operation on the moving control, the virtual character is controlled to stop moving.

Specifically, the moving control 306 is provided in the graphical user interface. When detecting the first sliding operation on the shooting control 301, the virtual character 303 is controlled to move in the game scene according to the first sliding operation. And when detecting the end of the third sliding operation on the moving control 306, the virtual character 303 is controlled to stop moving, so that the operations are diversified.

The moving control 306 may be a visible area in the graphical user interface, or may be an invisible area. Or, a control area of a virtual joystick or at least one direction control virtual key may be displayed in the moving control 306, which is not limited in the present exemplary embodiment.

In the present exemplary embodiment, the moving control and the aiming area are arranged on different sides of the graphical user interface.

Specifically, the aiming area 302 may be located at any position on the right side of the graphical user interface, and the corresponding moving control 306 may be located at any position on the left side of the graphical user interface. In an optional embodiment of the present disclosure, the aiming area 302 is located at the lower right of the graphical user interface, and the corresponding moving control 306 is located at the lower left of the graphical user interface and above the shooting control 301. Thus, in the present embodiment, a player may control the virtual character 303 to be purely moved in the game scene with a left hand according to a battle environment or to perform movement and shooting operations, and may control the virtual character 303 to perform the aiming operation with a right hand at the same time.

In the present exemplary embodiment, when detecting third sliding operation on the moving control, second indication information is provided.

The second indication information is used for indicating a current display state of the virtual character 303, and may prompt the player to distinguish a type of a current operated control. The second indication information may be an indication icon located above the virtual character 303, or may be a posture of the virtual character 303, or other information capable of indicating the display state of the virtual character 303. For example, when detecting the third sliding operation on the moving control 306, the virtual character 303 presents a posture of running.

By means of the method provided in at least one of the embodiments of the present disclosure, on one hand, a user may simultaneously control a virtual character to perform moving, aiming and shooting operations by the cooperation of both hands, so that a time difference caused by aiming and shooting operations in the conventional art is avoided, any switching operations are not needed from target discovery to shooting completion, the operation is not interrupted, and the aiming operation and the shooting operation are more efficient, convenient and smooth. On the other hand, since a player may always keep an aiming correction action without needing to raise the fingers to perform the shooting operation, the problem of aim shake and offset is avoided, and the shooting efficiency is improved. The technical problem of difficulty in smooth completion of three actions namely moving, aiming and shooting of a shooting game in an interactive mode of a mobile terminal is solved.

In another embodiment of the present disclosure, a virtual character controlling method apparatus is provided. The apparatus is provided by a mobile terminal having at least one processor for executing a software application and a touch screen rendered with a graphical user interface. The graphical user interface includes a shooting control and an aiming area, and the shooting control and the aiming area are arranged on different sides of the graphical user interface. The apparatus includes:

a first interactive element, configured to control, when detecting a first sliding operation on a shooting control, a virtual character to move according to the first sliding operation;

a second interactive element, configured to adjust, when detecting a second sliding operation on an aiming area, an aiming direction of the virtual character according to the second sliding operation; and a shooting control element, configured to control, when detecting the first sliding operation on the shooting control is ended, the virtual character to stop moving, and perform a shooting operation toward a current aiming direction of the virtual control object.

Specific details of the elements of the virtual character controlling apparatus have been described in detail in the corresponding virtual character controlling method. Therefore, detail descriptions are omitted herein.

It should be noted that although several components or elements of the device for action execution are mentioned in the above detailed description, such division is not mandatory. In fact, according to the implementation manners of the present disclosure, the features and functions of two or more components or elements described above may be embodied in one component or element. Conversely, the features and functions of one component or element described above may be further divided into multiple components or elements and embodied.

In another embodiment of the present disclosure, a computer-readable storage medium is also provided. A program product capable of implementing the above method of the present specification is stored thereon. In some possible implementation manners, various aspects of the present disclosure may also be implemented in the form of a program product, which includes at least one program code for causing a terminal device to execute the steps according to various exemplary implementation manners of the present disclosure described in the "Exemplary Method" section of the present specification when the program product runs on a terminal device. It may use a portable Compact Disc Read-Only Memory (CD-ROM) and include at least one program code, and may run on a terminal device such as a personal computer. However, the program product of the present disclosure is not limited thereto, and in this document, the readable storage medium may be any tangible medium that contains or stores a program. The program may be used by or in conjunction with an instruction execution system, device, or apparatus.

The program product may employ any combination of at least one readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples (non-exhaustive listings) of the readable storage medium include: electrical connectors with one or more wires, portable disks, hard disks, Random Access Memories (RAMs), ROMs, Erasable Programmable Read-Only Memories (EPROMs or flash memories), optical fibers, portable CD-ROMs, optical storage devices, magnetic storage devices, or any suitable combination of the above.

In another embodiment of the present disclosure, an electronic device is also provided. The electronic device includes: a processing component, which may further include at least one processor, and a memory resource represented by at least one memory and configured to store at least one instruction executable by the processing component, such as at least one application program. The at least one application program stored in the at least one memory may include at least one component each corresponding to a set of instructions. In addition, the processing component is configured to execute instructions to perform the above-described information processing method.

The electronic device may also include: a power supply component, configured to perform power management on the electronic device; a wired or wireless network interface, configured to connect the electronic device to a network; and an input output (I/O) interface. The electronic device may operate based on an operating system stored in the memory, such as Android, iOS, Windows, Mac OS X, Unix, Linux, FreeBSD, or the like.

The sequence numbers of the foregoing embodiments of the present disclosure are for description and do not represent the advantages and disadvantages of the embodiments.

In the foregoing embodiments of the present disclosure, the description of each embodiment has its own emphasis. For the part not described in detail in one embodiment, reference may be made to the relevant description of other embodiments.

In some embodiments provided by the present disclosure, it shall be understood that the disclosed technical content may be implemented in other modes. For example, the apparatus embodiment described above is schematic. For example, the division of the components or elements is the division of logical functions, and there may be additional division modes during practical implementation. For example, a plurality of elements or assemblies may be combined or integrated to another system, or some characteristics may be omitted or may be not executed; and in addition, displayed or discussed mutual coupling or direct coupling or communication connection may be performed via some interfaces, and indirect coupling or communication connection between apparatuses or elements may be in an electrical form, a mechanical form or other forms.

The elements illustrated as separate components may be or may not be physically separated. Components for element display may be or may not be physical elements. That is, the components may be located at a place or may be distributed on a plurality of network elements. The aims of the solutions of the embodiments may be achieved by selecting some or all elements according to actual requirements.

In addition, all function elements in all embodiments of the present disclosure may be integrated in a processing element, or each element may exist separately and physically, or two or more elements may be integrated in a element. The integrated element may be implemented in a hardware form or may be implemented in a software function element form.

If the integrated element is implemented in the form of a software function element and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including a plurality of instructions enabling a computer device (which may be a personal computer, a server or a network device) to execute all or some of the steps of the method according to each embodiment of the present disclosure.

The above are exemplary implementation manners of the present disclosure, and it should be pointed out that those of ordinary skill in the art can also make several improvements and modifications without departing from the principle of the present disclosure. These improvements and modifications should also be regarded as the scope of protection of the present disclosure.

What is claimed is:

1. A virtual character controlling method, provided by a mobile terminal having at least one processor for executing a software application and a touch screen rendered with a graphical user interface, the graphical user interface comprising a shooting control and an aiming area, the shooting control and the aiming area being arranged on different sides of the graphical user interface, the method comprising:
   when detecting a first sliding operation on the shooting control, controlling a virtual character to move according to the first sliding operation;
   when detecting a second sliding operation on the aiming area, adjusting an aiming direction of the virtual character according to the second sliding operation; and
   when detecting an end of the first sliding operation on the shooting control, controlling the virtual character to stop moving, and performing a shooting operation toward a current aiming direction of the virtual character.

2. The method as claimed in claim 1, further comprising:
   when detecting a touch operation on a preset area, controlling the virtual character to stop shooting.

3. The method as claimed in claim 1, further comprising:
   when detecting the first sliding operation on the shooting control, providing first indication information.

4. The method as claimed in claim 3, wherein when detecting the first sliding operation on the shooting control, the first indication information is used for indicating a current display state of the virtual character.

5. The method as claimed in claim 1, wherein the graphical user interface further comprises a moving control, the method comprising:
   when detecting a third sliding operation on the moving control, controlling the virtual character to move according to the third sliding operation; and
   when detecting the end of the third sliding operation on the moving control, controlling the virtual character to stop moving.

6. The method as claimed in claim 5, wherein the moving control and the aiming area are arranged on different sides of the graphical user interface.

7. The method as claimed in claim 5, further comprising:
   when detecting the third sliding operation on the moving control, providing second indication information.

8. The method as claimed in claim 7, wherein when detecting the third sliding operation on the moving control, the second indication information is used for indicating a current display state of the virtual character.

9. The method as claimed in claim 1, wherein adjusting the aiming direction of the virtual character according to the second sliding operation comprises:
   acquiring a current position of a touch point of the second sliding operation on the aiming area, and calculating a vector distance between the current position and a geometric center of the aiming area; and
   adjusting the aiming direction of the virtual character according to the vector distance.

10. The method as claimed in claim 1, wherein the shooting control is a visible area in the graphical user interface.

11. The method as claimed in claim 1, wherein the shooting control is a virtual joystick control area.

12. The method as claimed in claim 1, wherein the shooting control is a control area of a virtual joystick or at least one direction control virtual key in the graphical user interface.

13. The method as claimed in claim 1, wherein the aiming area is a visible area in the graphical user interface.

14. The method as claimed in claim 1, wherein the aiming area is an invisible area in the graphical user interface.

15. The method as claimed in claim 1, wherein the aiming area is a control area of a virtual joystick or at least one direction control virtual key in the graphical user interface.

16. The method as claimed in claim 1, wherein when detecting the second sliding operation acting on the aiming area, a telescopic sight model corresponding to the aiming area is provided in a geometric center of the graphical user interface.

17. The method as claimed in claim 16, wherein the telescopic sight model is fixed in the geometric center of the graphical user interface.

18. A non-transitory computer-readable storage medium, on which at least one computer program is stored, wherein the at least one computer program is executed by at least one processor, and the at least one computer program executed by at least one processor comprising:
   when detecting a first sliding operation on a shooting control, controlling a virtual character to move according to the first sliding operation;
   when detecting a second sliding operation on a aiming area, adjusting an aiming direction of the virtual character according to the second sliding operation; and
   when detecting an end of the first sliding operation on the shooting control, controlling the virtual character to stop moving, and performing a shooting operation toward a current aiming direction of the virtual character.

19. An electronic device, comprising:
   at least one processor; and
   at least one memory, configured to store at least one executable instruction of the at least one processor,
   wherein the at least one processor is configured to execute the at least one executable instruction, the at least one executable instruction comprising:
   when detecting a first sliding operation on a shooting control, controlling a virtual character to move according to the first sliding operation;
   when detecting a second sliding operation on a aiming area, adjusting an aiming direction of the virtual character according to the second sliding operation; and
   when detecting an end of the first sliding operation on the shooting control, controlling the virtual character to stop moving, and performing a shooting operation toward a current aiming direction of the virtual character.

* * * * *